United States Patent [19]

Shinomiya et al.

[11] Patent Number: 4,579,780
[45] Date of Patent: Apr. 1, 1986

[54] MAGNETIC RECORDING MEDIUM

[75] Inventors: Kuniichi Shinomiya; Masahiro Takizawa, both of Saku; Takehisa Ohkawa, Usuda, all of Japan

[73] Assignee: TDK Electronics Co., Ltd., Tokyo, Japan

[21] Appl. No.: 406,867

[22] Filed: Aug. 10, 1982

Related U.S. Application Data

[63] Continuation of Ser. No. 244,278, Mar. 16, 1981, abandoned, which is a continuation of Ser. No. 98,240, Nov. 28, 1979, abandoned.

[30] Foreign Application Priority Data

Jan. 12, 1978 [JP] Japan ................... 53-147846

[51] Int. Cl.$^4$ ............................................. H01F 10/02
[52] U.S. Cl. ................... 428/447; 428/695; 428/900
[58] Field of Search ............... 427/127–132, 427/48; 428/900, 694, 695, 447

[56] References Cited

U.S. PATENT DOCUMENTS 4,171,406 10/1979 Yamaguchi et al. ............... 428/900

Primary Examiner—Bernard D. Pianalto
Attorney, Agent, or Firm—Wyatt, Gerber, Shoup, Scobey and Badie

[57] ABSTRACT

A magnetic recording medium is provided which is assured of smoothly and stably running properties and is free of the so-called "squeal" phenomenon, especially in an environment of high temperature and high humidity. A highly viscous silicone oil having a viscosity of 100,000 or more is incorporated as a lubricating agent in the magnetic coating of the magnetic recording medium in an amount of 0.5 to 2% by weight based on binder. Such silicone oil is a dimethyl silicone oil having the following rational formula:

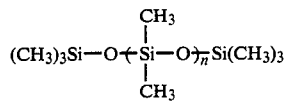

where n is a number which determines a viscosity thereof.

5 Claims, No Drawings

MAGNETIC RECORDING MEDIUM

This is a continuation, of application Ser. No. 244,278 filed Mar. 16, 1981, which is in turn a continuation of application Ser. No. 098,240 filed Nov. 28, 1979, now both abandoned.

BACKGROUND OF THE INVENTION

1. Field of the Invention

This invention relates to a magnetic recording medium comprising a base film coated with a magnetic powder mixed with a binder, that is, to magnetic recording tapes suitable for sound or video recording or for use in electronic computers. More particularly, the invention is concerned with a magnetic recording medium which is free of the so-called "squeal" phenomenon, or audible vibrations, of the running tape and is assured of smoothly and stably running properties, especially in environments of high temperature and high humidity.

2. Description of the Prior Art

In general, a magnetic recording tape, when used with a recording-reproducing apparatus such as a cassette tape deck, runs in sliding contact with the magnetic head, tape guides, etc., and therefore it is required to possess a low friction coefficient as well as smoothly and stably running properties. Actually, the tape running past the head, guides, etc. will sometimes stick to and slip on the contacting parts by turns and successively. This alternate stick-and-slip motion may gradually be intensified until longitudinal vibrations of the tape result. These vibrations, known as "stick-slip vibrations", are primarily responsible for the squeal of the tape. The latter phenomenon is not infrequent these days because a recent tendency is toward denser magnetic recording. In case of the magnetic tape, e.g., for audio use, a growing percentage of the products is designed to be low in running speed (4.75 cm/sec) and thinner (6-18μ).

In order to secure the running stability of the tape, it has been customary practice to incorporate in the magnetic coating material any of various lubricants including higher fatty acids and their derivatives, liquid paraffin, castor oil, fluorine oil, molybdenum disulfice, and graphite powder, in addition to the binder. However, none of those lubricants have yet imparted adequate lubricity to the tape; they are unsatisfactory in ensuring stable running performance and in preventing the squeal of the tape, particularly in environments of high temperature and high humidity (e.g., at 40° C.-60° C. and 70-90% RH). The present invention has for its object the provision of a magnetic recording medium which overcomes the abovementioned disadvantage of the prior art.

SUMMARY OF THE INVENTION

It has now been found that the object of the invention is attained by incorporating in the magnetic coating layer of the magnetic tape a highly viscous silicone oil (dimethyl polysiloxane) having a viscosity of 100,000 centistokes or more in an amount ranging from 0.5 to 2% by weight on the basis of the weight of the binder. Thus, in accordance with the invention, a magnetic tape is provided which is assured of smoothly and stably running properties, especially in environments of high temperature and high humidity, and is freed of "squeal" phenomenon which will otherwise result from the friction of the running tape with the magnetic head, tape guides, etc., by the incorporation into the magnetic coating or a small amount of a highly viscous silicone oil of a high polymerization degree having a certain viscosity.

DETAILED DESCRIPTION OF THE INVENTION

In the practice of the invention, it is essential that the silicone oil to be used has a certain viscosity, as high as 100,000 centistokes or more, or a high degree of polymerization. If the viscosity is outside the range specified under the invention, that is, lower than 100,000 cs, the oil will migrate so actively within the magnetic coating layer that its lubricity effect will not be sustained long and adequate control of "squeal" phenomenon will be impossible.

When using a silicone oil having a viscosity of 100,000 cs or more according to the invention, an amount of 0.5% or more by weight on the basis of the weight of the binder will be enough to prevent the squeal of the magnetic tape and achieve the expected object. It should be noted, however, that the amount of silicone oil required depends on the viscosity thereof. For example, the necessary amount of the oil having a viscosity of 100,000 cs is 1% by weight and that of the oil with a viscosity of 300,000 cs is 0.5% by weight. On the other hand, any attain more advantage of the invention by use of the silicone oil to excess (e.g., 5 wt% or more) will have a rather unfavorable effect, such as exudation of the oil to the magnetic coating layer surface and contamination of the magnetic head, etc. According to the invention, the incorporation of the silicone oil in an amount of between 0.5 and 2% by weight will achieve an ample effect of controlling the squeal with no such undesirable possibility of exudation up to the coating surface.

Thus, in the present invention, the high viscosity or polymerization degree of the silicone oil used will restrict the migration of the oil within the magnetic coating layer, and the oil will permit the magnetic tape to maintain its initial characteristics satisfactorily over a great number of passages. The amount of silicone oil to be used is small enough for the binder to keep the binding ability of the latter unaffected, and also it is too small to cause exudation of other objectionable phenomena or to have any deleterious effect upon the other properties of the magnetic tape.

The silicone oil to be employed as an additive in accordance with this invention is a dimethyl silicone oil consisting of dimethyl polysiloxane having the following rational formula:

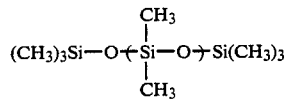

wherein n is a number which determines the viscosity. Such silicone oil is known per se in the art and is commercially available in varied grades. An example of the prior art in which such silicone oil is used in the manufacture of a magnetic recording medium is given in the published specification of Japanese Patent Application Public Disclosure No. 51703/1978 relating to an invention based on the combination of silicone oil and an amine compound. However, the silicone oil employed in the cited invention is of a low polymerization degree of viscosity of 3,000 cs or less, whereas the oil to be used in this invention is clearly distinguishable from it because of the much higher viscosity.

In practicing the invention, the incorporation of silicone oil in the magnetic coating layer is effectively done by mixing it into the coating material, in an amount from 0.5 to 5% by weight on the basis of the weight of the binder, during the process of preparing the magnetic coating.

The invention is illustrated by the following examples, which include working examples of the invention and comparative examples.

EXAMPLE 1

Magnetic powder ($\gamma$-$Fe_2O_3$)—100 parts by weight
Vinyl chloride-vinyl acetate copolymer—20 parts by weight
Urethane resin—5 parts by weight
Silicone oil (100,000 cs) (0.5–2 PHR)—0.125–0.5 parts by weight
Methyl ethyl ketone—120 parts by weight
Methyl isobutyl ketone—40 parts by weight
Toluene—40 parts by weight The above components were placed into a ball mill and then mixed and dispersed for 20 hours to prepare a magnetic coating material. The resulting coating material was applied on a 7$\mu$-thick polyethylene terephthalate film to form a layer about 5$\mu$ in thickness on dried solid basis, and was dried. After the drying, the coated surface was mirror finished by hot calender rolls. The film thus obtained was slitted into lengths of audiofrequency cassette tape 3.81 mm in width.

EXAMPLE 2

A tape was made by the same procedure as described in Example 1 except that the silicone oil (100,000 cs) of the preceding example was replaced by a silicone oil having a viscosity of 300,000 cs in an amount ranging from 0.125 to 0.25 parts by weight (0.5–1 PHR).

COMPARATIVE EXAMPLE 1

Repeating the procedure of Example 1 except that the silicone oil (100,000 cs) was replaced by a less viscous silicone oil of 10,000 cs in an amount of 1.5 parts by weight (6 PHR), a tape was manufactured.

COMPARATIVE EXAMPLE 2

In the same way as in Example 1 with the exception that the silicone oil (100,000 cs) was replaced by a less viscous silicone oil of 10,000 cs in an amount of 0.25 part by weight (1 PHR), a tape was obtained.

COMPARATIVE EXAMPLE 3

The silicone oil (100,000 cs) of Example 1 was not used. Otherwise in the same manner as in Example 1, a tape was made.

COMPARATIVE EXAMPLE 4

To obtain a tape, the procedure of Example 1 was repeated except that the silicone oil (100,000 cs) was replaced by a mineral oil in an amount of 0.5 part by weight (2 PHR).

The tapes made in the foregoing Examples and Comparative Examples were loaded in and caused to run continuously on cassette tape decks in a high temperature-high humidity environment of 60° C. and 70% RH, and the frequencies or rates of occurrence of squeal and other irregularities of the tapes were determined and evaluated. The results are summarized in the following table.

|  | Amount of lubricant added | Rate of occurrence of squeal | Remarks |
| --- | --- | --- | --- |
| Example 1 | 0.5 PHR | 25% |  |
|  | 1 | 10 |  |
|  | 2 | 0 |  |
| Example 2 | 0.5 | 5 |  |
|  | 1 | 0 |  |
| Comp. Ex. 1 | 6 | 0 | Exudation up to the tape surface |
| Comp. Ex. 2 | 1 | 60 |  |
| Comp. Ex. 3 | — | 80 |  |
| Comp. Ex. 4 | 2 | 90 |  |

As will be appreciated from the above table, it is possible in accordance with this invention to eliminate the squeal of the tape and fully ensure stable running performance in high-temperature and high-humidity environments.

What is claimed is:

1. A magnetic recording medium including a magnetic coating layer containing a dimethyl polysiloxane silicone oil having a viscosity of at least 100,000 centistokes and the formula:

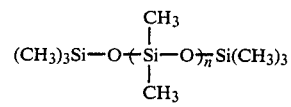

wherein n is a viscosity determining integer.

2. A magnetic recording medium according to claim 1 wherein the silicone oil has a viscosity of 300,000 centistokes.

3. A magnetic recording medium according to claim 1 containing 1% by weight of the silicone oil having the viscosity of 100,000 centistokes.

4. A magnetic recording medium according to claim 1 containing 0.5% by weight of the silicone oil having the viscosity of 300,000 centistokes.

5. A magnetic recording medium according to claim 1 containing from 0.5 to 2% by weight of the silicone oil based on the weight of the binder in the coating layer.

* * * * *